United States Patent
Kageyama et al.

(10) Patent No.: US 10,132,675 B2
(45) Date of Patent: Nov. 20, 2018

(54) COMBINATION WEIGHING DEVICE INCLUDING CONVEYORS AND CAMERAS

(71) Applicant: ISHIDA CO., LTD., Kyoto (JP)

(72) Inventors: Toshiharu Kageyama, Ritto (JP); Yoshito Inazumi, Ritto (JP); Yuji Okamoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 122 days.

(21) Appl. No.: 15/112,293

(22) PCT Filed: Jan. 15, 2015

(86) PCT No.: PCT/JP2015/050970
§ 371 (c)(1),
(2) Date: Jul. 18, 2016

(87) PCT Pub. No.: WO2015/108117
PCT Pub. Date: Jul. 23, 2015

(65) Prior Publication Data
US 2016/0334265 A1   Nov. 17, 2016

(30) Foreign Application Priority Data

Jan. 20, 2014 (JP) ................. 2014-007891

(51) Int. Cl.
*G01G 19/387* (2006.01)
*G01G 19/00* (2006.01)

(52) U.S. Cl.
CPC ........... *G01G 19/387* (2013.01); *G01G 19/00* (2013.01)

(58) Field of Classification Search
CPC ..... G01G 19/00; G01G 19/387; G01G 19/393
See application file for complete search history.

(56) References Cited

U.S. PATENT DOCUMENTS 5,270,495 A * 12/1993 Mosher ............... G01G 13/026
177/25.18
5,753,866 A * 5/1998 Ikeda ................... G01G 19/393
177/119

(Continued)

FOREIGN PATENT DOCUMENTS

JP       03-042529 A    2/1991
JP     2010-151787 A    7/2010

(Continued)

OTHER PUBLICATIONS

Patent Family List for JPH0342529 from the European Search Office, dated Jun. 18, 2018.*

(Continued)

*Primary Examiner* — Randy Gibson
(74) *Attorney, Agent, or Firm* — Studebaker & Brackett PC

(57) ABSTRACT

Provided is a combination weighing device whereby a physical quantity for assessing the quantity of articles loaded on a conveyance path for conveying articles to a weighing part can be accurately sensed in non-contact manner in order to appropriately control the supplying of articles to the weighing part, without the sensing being affected by a structure above the combination weighing device and/or side walls provided to sides of the conveyance path. A combination weighing device (10) is provided with cameras (60) and a plurality of radial feeders (30) for conveying articles to weighing hoppers (50). The radial feeders (30) have side walls (31*a*) for surrounding sides of an article conveyance path. The side walls (31*a*) extend upward and along a conveyance direction of the articles. The cameras (60) sense, in non-contact manner, a physical quantity for assessing a quantity of articles loaded on the radial feeders (30). The cameras (60) sense the physical quantity from above the (Continued)

radial feeders (30), and in an obliquely downward direction from an upstream side to a downstream side in the conveyance direction of the articles.

4 Claims, 8 Drawing Sheets

(56) References Cited

U.S. PATENT DOCUMENTS

| | | | | |
|---|---|---|---|---|
| 9,417,115 B2* | 8/2016 | Tamai | ............... | G01G 19/387 |
| 9,651,414 B2* | 5/2017 | Hofer | ............... | G01G 11/003 |

FOREIGN PATENT DOCUMENTS

| | | |
|---|---|---|
| WO | 95/31702 A1 | 11/1995 |
| WO | 2013/136933 A1 | 9/2013 |
| WO | 2013/179849 A1 | 12/2013 |

OTHER PUBLICATIONS

Computer Translation of WO/2013/179849 from the EPO, dated Jun. 18, 2018.*

The extended European search report issued by the European Patent Office dated Feb. 3, 2017, which corresponds to European Patent Application No. 15737190.7-1557 and is related to U.S. Appl. No. 15/112,293.

International Search Report issued in PCT/JP2015/050970; dated Feb. 10, 2015.

Written Opinion issued in PCT/JP2015/050970; dated Feb. 10, 2015.

European Patent Office, Machine-generated English translation of JP 3-42529 to Inoue, 11 pages, dated Mar. 28, 2018.

European Patent Office, Machine-generated English translation of JP 2013-250143, which is related to WO 2013/179849 to Tamai, 33 pages, dated Mar. 28, 2018.

International Preliminary Report on Patentability and Translation of Written Opinion of the International Searching Authority; PCT/JP2015/050970 dated Jul. 26, 2016.

* cited by examiner

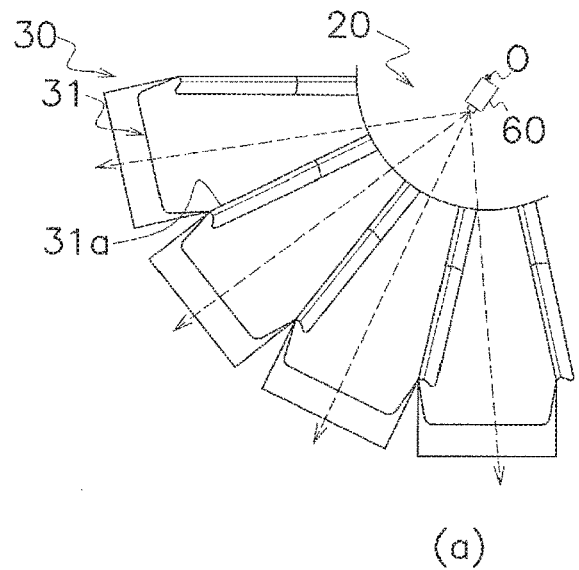
(a)
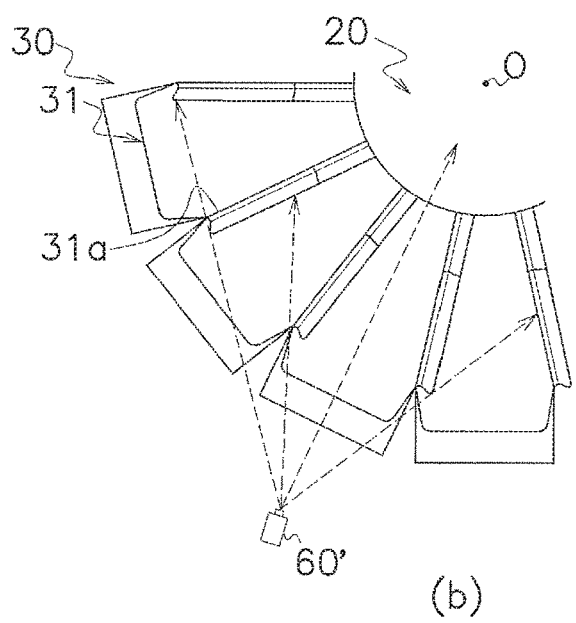
(b)
FIG. 5

COMBINATION WEIGHING DEVICE INCLUDING CONVEYORS AND CAMERAS

TECHNICAL FIELD

The present invention relates to a combination weighing device.

BACKGROUND ART

A configuration for a combination weighing device is conventionally known in which means is provided for sensing, in non-contact manner, the stacking height, the sparseness or density, or another characteristic (physical quantity for assessing the quantity of articles loaded on a drive feeder) of articles on a drive feeder for conveying the articles to a weighing part, in order to appropriately control the supplying of articles to the weighing part. For example, Patent Literature 1 (International Publication WO 95/31702) discloses a combination weighing device in which a camera for capturing an image of conveyed articles from a direction orthogonal to a conveyance direction of the drive feeder is provided to each drive feeder, and cameras above and side obliquely above the combination weighing device are provided for capturing an image of the drive feeders as means for sensing, in non-contact manner, a physical quantity for assessing the quantity of articles loaded on the drive feeder.

SUMMARY OF THE INVENTION

Technical Problem

The drive feeders are illustrated as being flat in Patent Literature 1 (International Publication WO 95/31702). However, it is actually common for the drive feeders to be provided with troughs having side walls, and the side walls prevent articles from mixing with articles on an adjacent drive feeder (see Patent Literature 2 (Japanese Laid-open Patent Publication No. 2010-151787), for example). Above a dispersion feeder, a charge chute for leading articles to the dispersion feeder is also commonly arranged between the dispersion feeder and a cross feeder on which articles are conveyed to the combination weighing device (see Patent Literature 2 (Japanese Laid-open Patent Publication No. 2010-151787), for example).

Therefore, even when a camera is provided for capturing an image of the articles from a direction orthogonal to the conveyance direction of the drive feeders, as in Patent Literature 1 (International Publication WO 95/31702), obstruction by the side walls of the troughs sometimes makes it difficult to capture an image of the conveyance state of the articles. The state of article conveyance on the conveyance path can be assessed only locally by a camera capturing an image of the articles from a direction orthogonal to the conveyance direction of the drive feeders. It is also difficult for a camera capturing an image of the drive feeders from side obliquely above the combination weighing device to capture an image of a portion obscured by a side wall of a trough. It is also difficult for a camera capturing an image of the drive feeders from above the combination weighing device to capture an image of a portion obscured by the charge chute. When it is difficult to obtain an overall assessment of the conveyance state of articles in conveyance paths as explained above, it is also difficult for cameras to accurately sense the physical quantity for assessing the quantity of articles loaded on the drive feeders.

An object of the present invention is to provide a combination weighing device whereby a physical quantity for assessing the quantity of articles loaded on a conveyance path for conveying articles to a weighing part can be accurately sensed in non-contact manner in order to appropriately control the supplying of articles to the weighing part, without the sensing being affected by a structure above the combination weighing device and/or side walls provided to sides of the conveyance path.

Solution to Problem

The combination weighing device according to the present invention is provided with a plurality of conveyance means each configured to convey articles to a weighing part, and sensing means. Each of the conveyance means has side walls for surrounding a side of an article conveyance path, the side walls extending upward and along a conveyance direction of the articles. The sensing means is configured to sense, in non-contact manner, a physical quantity for assessing a quantity of articles loaded on the conveyance means. The sensing means is configured to sense the physical quantity from above the conveyance means, in an obliquely downward direction from an upstream side to a downstream side in the conveyance direction.

Here, the sensing means senses the physical quantity for assessing the quantity of articles loaded on the conveyance means (sometimes referred to simply as the physical quantity hereinafter), in a direction along the conveyance direction of the conveyance means, and can therefore obtain an overall assessment of the conveyance state of articles in the conveyance means, in contrast with a case in which the physical quantity is sensed from a direction orthogonal to the conveyance direction. When the physical quantity is sensed from a direction orthogonal to the conveyance direction, the side walls may obstruct to sense the physical quantity. Whereas, in the present invention, the physical quantity is sensed in the direction from the upstream side to the downstream side in the conveyance direction, and the ability to assess the conveyance state of the articles is unaffected by the side walls. It is therefore possible by this configuration to accurately sense, in non-contact manner, the physical quantity for assessing the quantity of articles loaded on the conveyance means without the sensing being affected by the side walls.

The combination weighing device according to the present invention is provided with a plurality of conveyance means, a dispersing means, a charge chute, and a sensing means. The conveyance means are each configured to convey articles to a weighing part. The dispersing means is configured to disperse and supply the articles to the conveyance means. The charge chute is arranged above the dispersing means. The articles to be supplied to the dispersing means are charged into the charge chute. The sensing means is configured to sense, in non-contact manner, a physical quantity for assessing a quantity of articles loaded on the conveyance means. The sensing means is configured to sense the physical quantity from a location which is above the conveyance means and other than directly above the charge chute, and in an obliquely downward direction from an upstream side to a downstream side in the conveyance direction.

Here, the sensing means senses the physical quantity for assessing the quantity of articles loaded on the conveyance means, in a direction along the conveyance direction of the conveyance means, from a location which is above the conveyance means and other than directly above the charge chute, and it is therefore possible to obtain an overall assessment of the conveyance state of articles in the conveyance means without the assessment being affected by the presence of the charge chute, in contrast with a case in which the physical quantity is sensed from directly above the charge chute. It is therefore possible by this configuration to accurately sense, in non-contact manner, the physical quantity for assessing the quantity of articles loaded on the conveyance means without the sensing being affected by the presence of the charge chute.

When the conveyance means have the side walls, extending upward and along the article conveyance direction, for surrounding sides of the article conveyance path, the combination weighing device according to the present invention is preferably further provided with a dispersing means and a charge chute. The dispersing means is configured to disperse and supply the articles to the conveyance means. The charge chute is arranged above the dispersing means. The articles to be supplied to the dispersing means are charged into the charge chute. Preferably, the sensing means is configured to sense the physical quantity from a location which is above the conveyance means and other than directly above the charge chute, in the obliquely downward direction from the upstream side to the downstream side in the conveyance direction.

By this configuration, it is possible to accurately sense, in non-contact manner, the physical quantity for assessing the quantity of articles loaded on the conveyance means without the sensing being affected by the presence of the charge chute or the side walls of the conveyance means.

Preferably, in the combination weighing device according to the present invention, the side walls of the conveyance means have a highest portion thereof on a downstream side relative to a center part of the conveyance means in the conveyance direction.

In such cases as when a large quantity of articles is present on a certain conveyance means and few articles are present on a conveyance means adjacent to that conveyance means, a configuration in which the side walls are formed so as to be relatively low on the upstream side in the conveyance direction makes it possible for articles to be transferred from the conveyance means on which a large quantity of articles is present to the conveyance means on which a small quantity of articles is present. In other words, because the side walls on the upstream sides of the conveyance means are formed so as to be relatively low, the upstream sides of the conveyance means can function as article stock parts for supplying articles equally to each conveyance means. Meanwhile, on the downstream sides of the conveyance means, in order to appropriately control the quantity of articles conveyed to each weighing part, the side walls of the conveyance means are formed so that the height is greatest on the downstream side, and articles are prevented from moving between conveyance means.

When the side walls have the highest portions thereof on the downstream side, effects such as those described below are obtained by a configuration in which the sensing means senses the physical quantity, which is a quantity for assessing the quantity of articles loaded on the conveyance means, from the upstream side to the downstream side in the conveyance direction.

When the physical quantity is sensed for articles on a plurality of conveyance means by a single sensing means and the side walls of the conveyance means are formed so that the height is greatest on the downstream side in the conveyance direction, a problem emerges that some portions are obscured by the side walls, and sensing of the physical quantity is prone to be obstructed when the physical quantity is to be sensed by the sensing means from the downstream side. In contrast, because the physical quantity is sensed from the upstream side to the downstream side in the conveyance direction in this configuration, the physical quantity of the articles on a plurality of conveyance means can readily be sensed by a single sensing means.

Further, in this configuration, because the height of the side walls of the conveyance means is largest on the downstream side of the conveyance means and articles do not readily move between conveyance means on the downstream side of the conveyance means, the conveyance state on the downstream side of the conveyance means is relatively easy to estimate when the conveyance state on the upstream side of the conveyance means is assessed. Also, because the sensing means senses the physical quantity from the upstream side to the downstream side in this configuration, for assessing the quantity of articles loaded on the conveyance means, an overall assessment of the conveyance state of the conveyance means is easily obtained even in cases where the physical quantity for the more distant downstream side cannot be sensed.

Preferably, in the combination weighing device according to the present invention, the combination weighing device includes one or more sensing means, and each of the sensing means is configured to sense the physical quantity of the articles on two or more of the conveyance means.

Here, because the physical quantity is sensed for the articles on a plurality of conveyance means by a single sensing means, it is possible to reduce the number of sensing means and reduce the manufacturing cost of the combination weighing device, compared to a case in which the physical quantity of the articles on a single conveyance means is sensed by a single sensing means.

Preferably, in the combination weighing device according to the present invention, the sensing means is installed in a portion further upstream in the conveyance direction than a center part of the conveyance means in the conveyance direction.

Here, because the sensing means is installed in a portion further upstream than the center part of the conveyance means in the conveyance direction, an overall assessment of the conveyance state of articles in the conveyance path is easily obtained. The physical quantity for assessing the quantity of articles loaded on the conveyance means therefore can be accurately sensed in non-contact manner.

Advantageous Effects of Invention

In the combination weighing device according to the present invention, when the conveyance means have side walls, the sensing means senses the physical quantity for assessing the quantity of articles loaded on the conveyance means, in a direction along the conveyance direction of the conveyance means, and can therefore obtain an overall assessment of the conveyance state of articles in the conveyance means, in contrast with a case in which the physical quantity is sensed from a direction orthogonal to the conveyance direction. When the physical quantity is sensed from a direction orthogonal to the conveyance direction, the side walls may obstruct to sense the physical quantity. Whereas, in the present invention, the physical quantity is sensed in the direction from the upstream side to the downstream side in the conveyance direction, and the ability to assess the conveyance state of the articles is unaffected by the side walls. It is therefore possible by this configuration to accurately sense, in non-contact manner, the physical quantity for assessing the quantity of articles loaded on the conveyance means without the sensing being affected by the side walls.

In the combination weighing device according to the present invention, when the charge chute is present above the dispersing part for supplying articles to a conveyance part, the sensing means senses the physical quantity for assessing the quantity of articles loaded on the conveyance means, in a direction along the conveyance direction of the conveyance means, from a location which is above the conveyance means and other than directly above the charge chute. It is therefore possible to obtain an overall assessment of the conveyance state of articles in the conveyance means without the assessment being affected by the presence of the charge chute, in contrast with a case in which the physical quantity is sensed from directly above the charge chute. It is therefore possible by this configuration to accurately sense, in non-contact manner, the physical quantity for assessing the quantity of articles loaded on the conveyance means without the sensing being affected by the presence of the charge chute.

BRIEF DESCRIPTION OF THE DRAWINGS

FIG. 2 omits the supply feeder and the charge chute.

FIG. 5 is a diagram for explaining the merits of capturing an image of the articles on the radial feeders of the combination weighing device illustrated in FIG. 1 so that the image of the articles is captured in a direction from the upstream side to the downstream side in the conveyance direction of the articles on the radial feeders. FIG. 5 omits the supply feeder and the charge chute. FIG. 5(a) is a view illustrating a case in which a camera captures an image of the articles on the radial feeders in the direction from the upstream side to the downstream side in the conveyance direction of the articles of the radial feeders. FIG. 5(b) is a view illustrating a case in which a camera captures an image of the articles on the radial feeders in the direction from the downstream side to the upstream side in the conveyance direction of the articles of the radial feeders.

DESCRIPTION OF EMBODIMENTS

Embodiments of the combination weighing device according to the present invention will be described with reference to the accompanying drawings. The embodiments described below are specific examples of the present invention, and do not limit the technical scope of the present invention.

First Embodiment

A combination weighing device 10 according to a first embodiment of the present invention will be described.

(1) Overall Configuration

Figure 1:
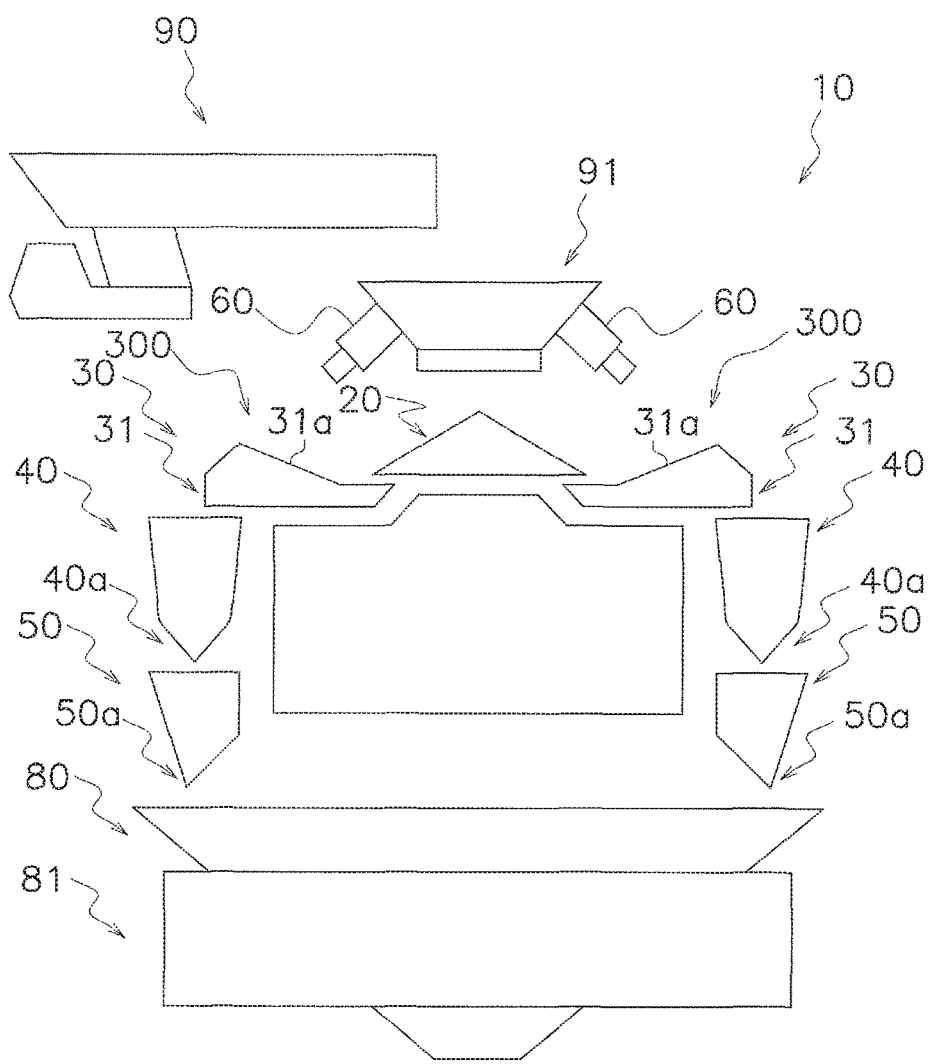
FIG. 1 is a schematic side elevational view of the combination weighing device according to a first embodiment of the present invention.
Figure 2:
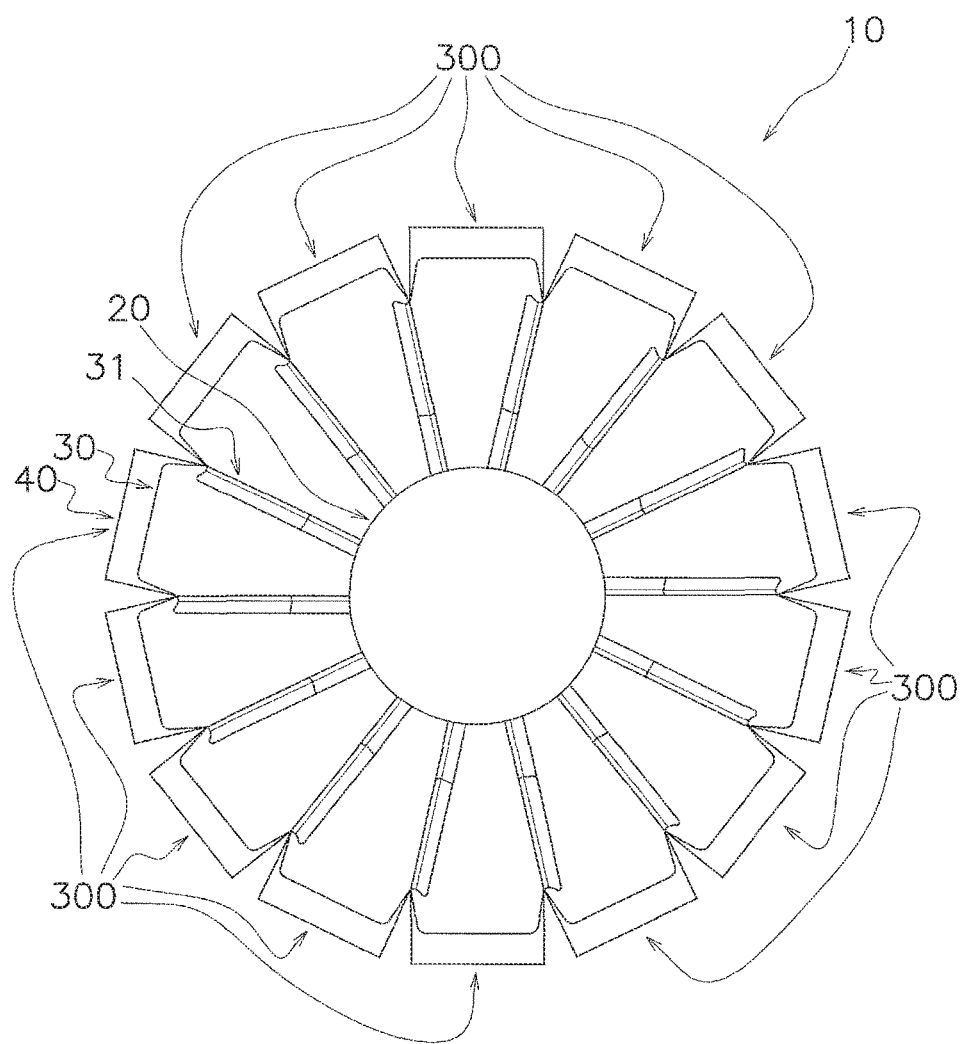
FIG. 2 is a schematic plan view of the combination weighing device of FIG. 1 as viewed from above.
Figure 3:
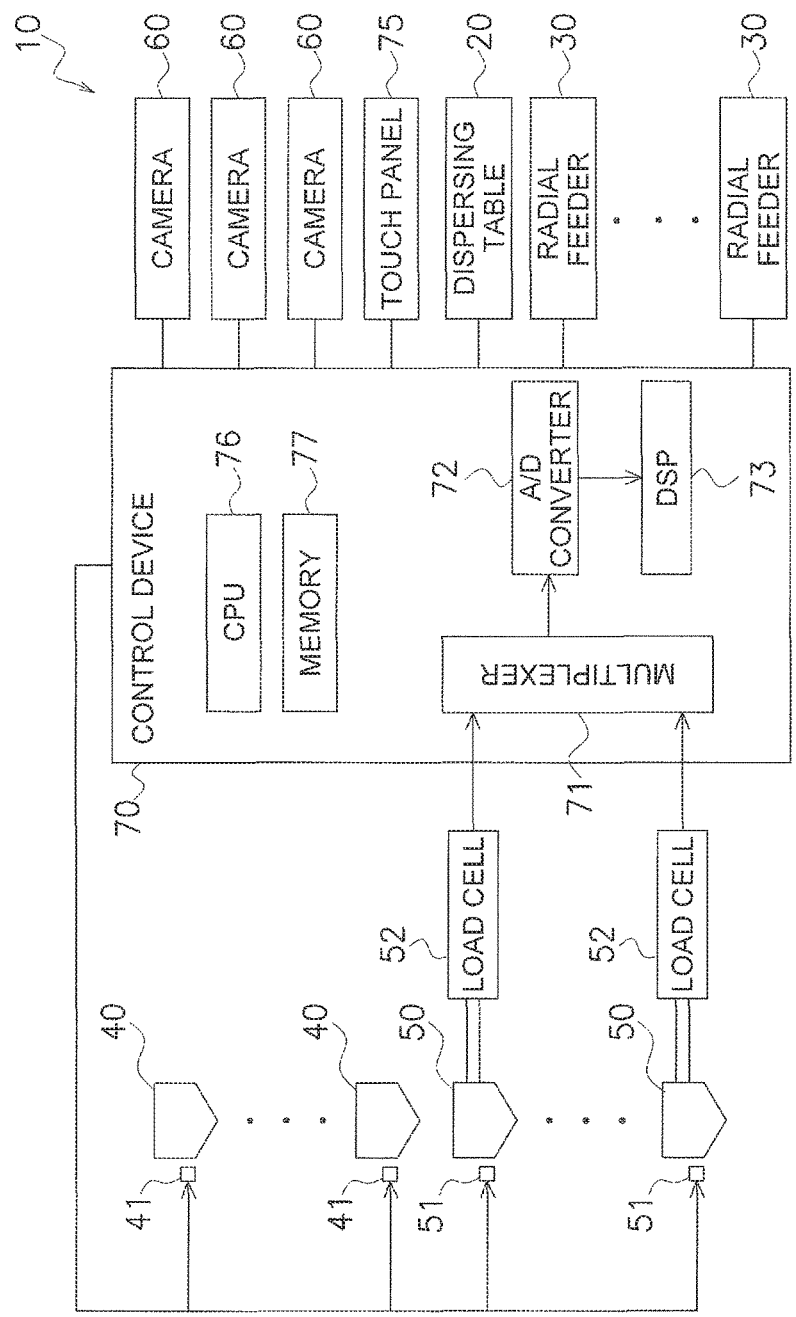
FIG. 3 is a block diagram of the combination weighing device illustrated in FIG. 1.

As illustrated in FIGS. 1 through 3, the combination weighing device 10 according to a first embodiment of the present invention has primarily a charge chute 91, a dispersing table 20, fourteen conveyance/weighing mechanisms 300, a collection discharge chute 80, three cameras 60, a control device 70, and a touch panel 75. The conveyance/weighing mechanisms 300 are arranged annularly about the dispersing table 20 as viewed from above (see FIG. 2). Each of the conveyance/weighing mechanisms 300 has a radial feeder 30, a pool hopper 40, and a weighing hopper 50. The combination weighing device 10 is supported by a main body frame 81 (see FIG. 1).

The combination weighing device 10 functions generally as described below.

A cross feeder 90 conveys articles to the combination weighing device 10. The articles, which are to be supplied from the cross feeder 90 to the dispersing table 20, are charged into the charge chute 91 arranged above the dispersing table 20. The articles supplied to the dispersing table 20 via the charge chute 91 are dispersed and supplied to the plurality of conveyance/weighing mechanisms 300. Specifically, the articles supplied from the cross feeder 90 are dispersed and supplied to the plurality of radial feeders 30 by the dispersing table 20. Each of the radial feeders 30 conveys articles supplied from the dispersing table 20 to the pool hopper 40 of the conveyance/weighing mechanism 300 to which that radial feeder 30 belongs, and supplies the articles to that pool hopper 40. The articles supplied to each pool hopper 40 are transferred to a weighing hopper 50 arranged below that pool hopper 40. The control device 70 performs combination calculation of a weighing value of the articles in the plurality of weighing hoppers 50 and selects a combination of articles in which the result of the combination calculation has the smallest value within a predetermined allowable range. The articles in the weighing hopper 50 included in the selected combination are discharged to the collection discharge chute 80. The articles discharged to the collection discharge chute 80 are supplied, for example, to a bag-making packaging machine or the like installed at a stage subsequent to the combination weighing device 10.

(2) Detailed Configuration

The combination weighing device 10 will be described in detail.

(2-1) Charge Chute

The charge chute 91 is a chute into which the articles to be supplied to the dispersing table 20 are charged by the cross feeder 90 (see FIG. 1). The charge chute 91 is arranged below an end part of the cross feeder 90 from which articles drops, and above the dispersing table 20 (see FIG. 1). The charge chute 91 is formed as a hollow inverted truncated cone shape, a lower end (dispersing table 20 side) of which is narrower than a top part (cross feeder 90 side) thereof (see FIG. 1). Due to the presence of the charge chute 91, articles charged from the cross feeder 90 are not prone to scattering out of the dispersing table 20, and are readily supplied onto the dispersing table 20.

(2-2) Dispersing Table

The dispersing table 20 is an example of dispersing means. The articles supplied from the cross feeder 90 are dispersed and supplied to the plurality of radial feeders 30 by the dispersing table 20 (see FIG. 1).

The dispersing table 20 is formed in a conical shape (see FIG. 1). The dispersing table 20 receives a supply of articles from the cross feeder 90 arranged above the dispersing table 20 via the charge chute 91. The dispersing table 20 is oscillated by an electromagnet not illustrated in the drawings, whereby the articles supplied from the cross feeder 90 are conveyed radially outward while being dispersed in a circumferential direction, and are supplied to the radial feeders 30. The quantity of articles conveyed from the dispersing table 20 to the radial feeders 30 varies according to the quantity of articles supplied from the cross feeder 90 to the dispersing table 20, and/or the oscillation intensity of the dispersing table 20.

(2-3) Radial Feeders

The radial feeders 30 are examples of conveyance means. The radial feeders 30 convey articles to the weighing hoppers 50 via the pool hoppers 40 (see FIG. 1). Each of the radial feeders 30 is equipped with a trough 31 (see FIGS. 1 and 2). The troughs 31 are formed so as to be concave and open at a top thereof, and have side walls 31a for surrounding sides of an article conveyance path. The side walls 31a extends upward and along a conveyance direction of the radial feeders 30 (see FIG. 1). The radial feeders 30 convey articles on the troughs 31 to the pool hoppers 40.

The troughs 31 of the plurality of (fourteen in this case) radial feeders 30 are arranged annularly on a periphery of the dispersing table 20 so that the troughs 31 extend radially from the dispersing table 20 (see FIG. 2). Articles are supplied from the dispersing table 20 to the troughs 31. Each of the troughs 31 is oscillated by an electromagnet not illustrated in the drawings, whereby the articles supplied from the dispersing table 20 are conveyed radially outward toward an outside edge of that trough 31. In other words, the articles on each of the troughs 31 are conveyed in a direction away from the dispersing table 20. The articles conveyed on each of the troughs 31 are supplied to the pool hopper 40 arranged below an outside edge side of that troughs 31. The quantity of articles conveyed from each of the troughs 31 to the pool hopper 40 varies according to the quantity of articles supplied from the dispersing table 20 to each of the radial feeders 30, and/or the oscillation intensity and oscillation time of each of the troughs 31.

The side walls 31a of the troughs 31 will be described. The side walls 31a of each of the troughs 31 are formed so as to have a height along the conveyance direction (see the arrow D in FIG. 4) of articles on each of the radial feeders 30 as described below.

Each side wall 31a is formed so that a height thereof is a minimum height H1 from an end part on an upstream side thereof to a predetermined position in the conveyance direction. In each side wall 31a, the height thereof gradually increases toward the downstream side in the conveyance direction from an end part on a downstream side of a portion thereof formed at the minimum height H1, and the height reaches a maximum height H2 at a predetermined position. Each side wall 31a is furthermore formed so as to gradually become lower toward the downstream side in the conveyance direction from a portion thereof having the maximum height H2. The height of the side walls 31a at the end parts on the downstream sides in the conveyance direction is greater than the minimum height H1.

Figure 4:
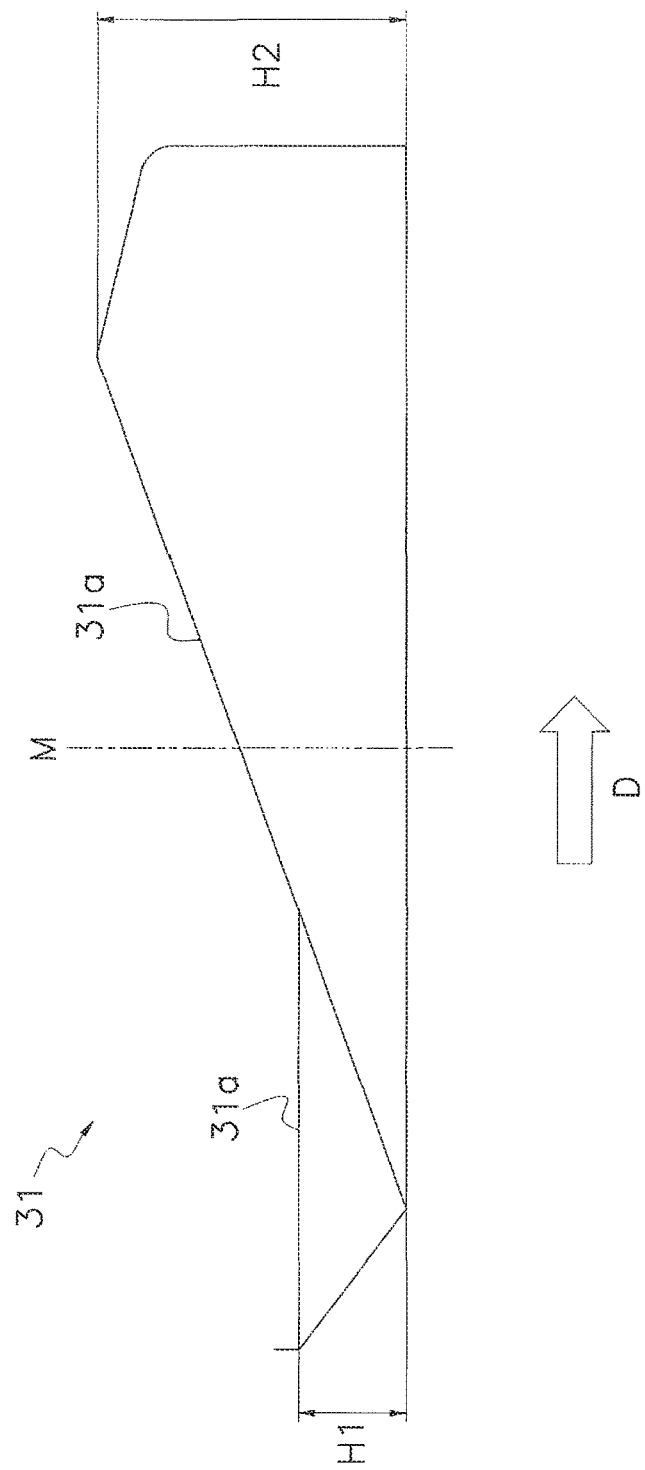
FIG. 4 is a side elevational view of a trough of a radial feeder of the combination weighing device illustrated in FIG. 1.

The portion of each side wall 31a where the height thereof is the minimum height H1 is arranged further upstream in the conveyance direction than a center part M of the trough 31 of each radial feeder 30 in the conveyance direction of the articles (see FIG. 4). The portion of each side wall 31a where the height thereof is the maximum height H2 is arranged further downstream in the conveyance direction than the center part M of the trough 31 of each radial feeder 30 in the conveyance direction of the articles (see FIG. 4). The minimum height H1 is 30 mm, for example, and the maximum height H2 is 90 mm, for example. These numerical values of the minimum height H1 and the maximum height H2 are given by way of example and are not limited to these values.

The average of the height of the side walls 31a on the upstream side relative to the center parts M of the troughs 31 of the radial feeders 30 in the article conveyance direction is less than the average of the height of the side walls 31a on the downstream side relative to the center parts M.

Since the side walls 31a of the troughs 31 are formed so that the height thereof is lower on the upstream side and higher on the downstream side in the conveyance direction of the articles, following effects are obtained.

First, forming the side walls 31a so as to be relatively low on the upstream side thereof in the conveyance direction of the articles makes it possible for articles to be transferred from a trough 31 on which a large quantity of articles is present to a trough 31 on which a small quantity of articles is present. A specific description will now be given. In an example, a large quantity of articles (reaching a position higher than a side wall 31a) is present on the upstream side of a certain trough 31, and few articles are present on a trough 31 adjacent to that trough 31. In this case, articles are expected to cross over the side wall 31a and move from the trough 31 on which a large quantity of articles is present to the trough 31 on which few articles are present. In other words, because the side walls 31a on the upstream sides of the troughs 31 are formed so as to be relatively low, the upstream sides of the radial feeders 30 can function as article stock parts for supplying articles equally to each of the troughs 31.

Meanwhile, the troughs 31 are formed so that the side walls 31a are highest on the downstream sides thereof, and articles are therefore easily prevented from moving between troughs 31 on the downstream sides of the troughs 31. The quantity of articles transferred from each of troughs 31 to the weighing hopper 50 installed at a stage subsequent to that trough 31 can therefore be appropriately controlled.

(2-4) Pool Hoppers

Articles supplied from the radial feeders 30 arranged above the pool hoppers 40 are temporarily retained in the pool hoppers 40. Each of the pool hoppers 40 is arranged below the outside edge side of the trough 31 provided to the radial feeder 30 of the respective conveyance/weighing mechanism 300 to which that pool hopper 40 belongs.

Each of the pool hoppers 40 has a PH gate 40a in a bottom part thereof. When each PH gate 40a is opened, the articles in the pool hopper 40 are supplied to the weighing hopper 50 arranged below that pool hopper 40. Each of the PH gates 40a is opened/closed by actuating a link mechanism not illustrated in the drawings by a stepping motor 41 (see FIG. 3). Opening/closing by the stepping motor 41 is controlled by the control device 70.

(2-5) Weighing Hoppers

The weighing hoppers 50 are examples of the weighing part. The weighing hoppers 50 measure the weight of articles supplied from the pool hoppers 40, i.e., the weight of articles supplied from the radial feeders 30 via the pool hoppers 40. Each of the weighing hoppers 50 is arranged below the pool hopper 40 of the respective conveyance/weighing mechanism 300 to which each weighing hopper 50 belongs.

Each of the weighing hoppers 50 has a WH gate 50a in a bottom part thereof. When each WH gate 50a is opened, the articles in the weighing hopper 50 are supplied to the collection discharge chute 80. Each of the WH gates 50a is opened/closed by actuating a link mechanism not illustrated in the drawings by a stepping motor 51 (see FIG. 3). Opening/closing by the stepping motors 51 is controlled by the control device 70.

Each of the weighing hoppers 50 has a load cell 52 for weighing the articles retained in the weighing hopper 50 thereof. Results of weighing by the load cells 52 are transmitted as weighing signals to a multiplexer 71 of the control device 70 described hereinafter, via an amplifier not illustrated in the drawings.

(2-6) Collection Discharge Chute

The collection discharge chute 80 collects the articles supplied from the weighing hoppers 50 and discharges the articles out of the combination weighing device 10. The articles discharged out of the combination weighing device 10 are supplied to a bag-making packaging machine or the like not illustrated in the drawings which is installed below the collection discharge chute 80, for example.

(2-7) Cameras

The cameras 60 are examples of sensing means. The cameras 60 are also examples of imaging means. The cameras 60 capture an image of the articles on the troughs 31, i.e., on the radial feeders 30. The cameras 60 obtain an image of the articles, whereby a physical quantity for assessing the quantity of articles loaded on the troughs 31 of the radial feeders 30, e.g., the stacking height of articles on the troughs 31 and/or the sparseness or density of articles on the troughs 31 (area of a region occupied by articles on a conveyance surface with respect to the entire area of the conveyance surface of the troughs 31) or another characteristic, is sensed in non-contact manner. Sensing herein includes not only cases where a physical quantity for assessing the quantity of articles loaded on the troughs 31 is quantitatively sensed, but also cases of qualitative sensing. The cameras 60 capture a moving image of a conveyance state of articles on the troughs 31. The number of cameras 60 is three. The lenses of the cameras 60 are wide-angle lenses having a horizontal view angle of 120° or greater.

The cameras 60 are attached to an external peripheral surface of the charge chute 91 (see FIG. 1). The cameras 60 are installed in locations other than directly above the charge chute 91. The cameras 60 are installed above the radial feeders 30. The cameras 60 are installed in portions further upstream in the article conveyance direction of the radial feeders 30 than the center parts M (see FIG. 4) in the article conveyance direction of the radial feeders 30.

The cameras 60 are attached at intervals of 120° about a center of the charge chute 91 in plan view, so as to be arranged at equal intervals on the external peripheral surface of the charge chute 91. The cameras 60 are attached to the external peripheral surface of the charge chute 91 so that the lenses of the cameras 60 are oriented obliquely downward and radially outward with respect to the center of the charge chute 91. The cameras 60 capture an image of the articles on each of the radial feeders 30, i.e., on the respective troughs 31, from above the radial feeders 30 and in an obliquely downward direction from the upstream side (dispersing table 20 side) to the downstream side (pool hopper 40 side) in the conveyance direction of the articles of the radial feeders 30. In other words, the cameras 60 sense the physical quantity for assessing the quantity of articles loaded on the troughs 31, from above the radial feeders 30 and in an obliquely downward direction from the upstream side to the downstream side in the article conveyance direction of the radial feeders 30. The cameras 60 also capture an image of the articles on each of the troughs 31 from a location which is above the radial feeders 30 and other than directly above the charge chute 91, in an obliquely downward direction from the upstream side to the downstream side in the conveyance direction of the articles of the radial feeders 30. That is to say, the cameras 60 sense the physical quantity for assessing the quantity of articles loaded on each of the troughs 31, from a location which is above the radial feeders 30 and other than directly above the charge chute 91, in an obliquely downward direction from the upstream side to the downstream side in the conveyance direction of the articles of the radial feeders 30. The cameras 60 capture an image of each of the troughs 31 as a whole. In other words, the cameras 60 are attached to the charge chute 91 in a position and orientation whereby an image of the articles on respective the troughs 31 can be captured over an entire range from a boundary portion between the dispersing table 20 and the troughs 31 to external peripheral end parts of the troughs 31.

Each of the cameras 60 captures an image of articles on a plurality of troughs 31. In other words, each of the cameras 60 senses the physical quantity for assessing the quantity of articles loaded on the troughs 31 for the articles on a plurality of troughs 31. An image of the articles on any of the troughs 31 is captured by at least one camera 60 from a location which is above the troughs 31 and other than directly above the charge chute 91, in an obliquely downward direction from the upstream side to the downstream side in the conveyance direction of the troughs 31. The articles on a trough 31 may include articles for which images are captured redundantly by a plurality of cameras 60.

(2-8) Control Device

The control device 70 has a CPU 76 and memory 77 such as ROM and/or RAM (see FIG. 3). The control device 70 also has the multiplexer 71, an A/D converter 72, and a DSP (digital signal processor) 73 (see FIG. 3).

The multiplexer 71 selects one weighing signal from the weighing signals of the load cells 52 in accordance with an instruction from the DSP 73, and then transmits the weighing signal to the A/D converter 72. The A/D converter 72 converts the weighing signal (analog signal) received from the multiplexer 71 to a digital signal in accordance with a timing signal transmitted from the DSP 73, and transmits the digital signal to the DSP 73. The DSP 73 performs filtering of the digital signal transmitted from the A/D converter 72.

The control device 70 is connected to the dispersing table 20, the radial feeders 30, the stepping motors 41, 51, the cameras 60, the touch panel 75, and other components of the combination weighing device 10. In the control device 70, the CPU 76 controls the components of the combination weighing device 10 by executing a program stored in the memory 77.

The control device 70 specifically performs control as described below, for example.

For example, the control device 70 controls the electromagnets (not illustrated in the drawings) of the dispersing table 20 and the electromagnets of the radial feeders 30 based on an operating parameter such as an oscillation intensity for the dispersing table 20 and the radial feeders 30, and/or an oscillation time for the radial feeders 30 inputted from the touch panel 75, and causes the dispersing table 20 and the troughs 31 of the radial feeders 30 to oscillate.

The control device 70 furthermore assesses the stacking height and/or the sparseness or density or another characteristic (physical quantity for assessing the quantity of articles loaded on the troughs 31 of the radial feeders 30) of articles on the radial feeders 30 using an image captured by the cameras 60, as in Patent Literature 1 (WO 95/31702), for example. The control device 70 then changes the operating parameter such as the oscillation intensity or oscillation time of the radial feeders 30, as appropriate, based on the assessed result in order to appropriately control the supplying of articles to the weighing hoppers 50.

The control device 70 also computes the weight of the articles retained in each of the weighing hoppers 50 using the signal filtered by the DSP 73 and performs combination calculation so that the total weights fall within a predetermined target weight range, for example. The control device 70 determines a single combination of weighing hoppers 50 in which the total weight falls within the predetermined target weight range and controls actuation of the stepping motor 51 so that the WH gates 50a of the determined weighing hoppers 50 open. When any of the weighing hoppers 50 are empty, the control device 70 operates the stepping motors 41 so as to open the PH gates 40a of the pool hoppers 40 arranged above those weighing hoppers 50.

(2-9) Touch Panel

The touch panel 75 is a liquid crystal display (LCD) provided with both input and output functions, and functions as an input part and an output part.

The touch panel 75 receives various types of settings and other inputs relating to combination weighing. For example, the touch panel 75 receives inputting of the oscillation intensity of the dispersing table 20 and the radial feeders 30 and/or the oscillation time of the radial feeders 30, and other operating parameters.

Further, the operating state of the combination weighing device 10 is displayed on the touch panel 75. For example, a moving image (moving image of the conveyance state of articles on the troughs 31) of the articles on the troughs 31 captured by the cameras 60 is displayed on the touch panel 75.

The image captured by the cameras 60 is displayed on the touch panel 75 in this configuration, but the embodiment is not limited to this configuration. For example, a configuration may be adopted in which a display other than the touch panel 75 is provided, and the image captured by the cameras 60 is displayed on the display instead of on the touch panel 75, or in addition to being displayed on the touch panel 75.

(3) Features (3-1)

The combination weighing device 10 according to the present embodiment is provided with the cameras 60 and the plurality of radial feeders 30 each for conveying articles to the weighing hopper 50. The weighing hoppers 50 are examples of the weighing part, the radial feeders 30 are examples of conveyance means, and the cameras 60 are examples of sensing means. The radial feeders 30, or more specifically, the troughs 31 of the radial feeders 30, have side walls 31a for surrounding sides of article conveyance paths. The side walls 31a extend upward and along the conveyance direction of the articles. The cameras 60 capture an image of the articles on the troughs 31 of the radial feeders 30, and thereby sense, in non-contact manner, the physical quantity for assessing the quantity of articles loaded on the troughs 31. The cameras 60 capture an image of the articles from above the radial feeders 30, in an obliquely downward direction from the upstream side to the downstream side in the conveyance direction. In other words, the cameras 60 sense the physical quantity for assessing the quantity of articles loaded on the troughs 31, from above the radial feeders 30 and in an obliquely downward direction from the upstream side to the downstream side in the conveyance direction.

Here, the cameras 60 capture an image of the articles in a direction along the conveyance direction of the radial feeders 30, and can therefore obtain an overall assessment of the conveyance state of articles in the radial feeders 30, in contrast with a case in which an image of the articles is captured from a direction orthogonal to the conveyance direction. In other words, the cameras 60 sense the physical quantity for assessing the quantity of articles loaded on the troughs 31 of the radial feeders 30 (sometimes referred to simply as the physical quantity hereinafter), in a direction along the conveyance direction of the radial feeders 30, and can therefore obtain an overall assessment of the conveyance state of articles in the radial feeders 30, in contrast with a case in which the physical quantity is sensed from a direction orthogonal to the conveyance direction. When an image of the articles is captured from a direction orthogonal to the conveyance direction, the side walls 31a may obstruct to capture an image of the articles. Whereas, in the configuration of the present embodiment, an image of the articles is captured in the direction from the upstream side to the downstream side in the conveyance direction, and the ability to capture an image of the conveyance state of the articles is unaffected by the side walls 31a. In other words, when the physical quantity is sensed from a direction orthogonal to the conveyance direction, the side walls 31a may obstruct to sense the physical quantity. Whereas, in the configuration of the present embodiment, the physical quantity is sensed in the direction from the upstream side to the downstream side in the conveyance direction, and the ability to assess the conveyance state of the articles is unaffected by the side walls 31a. It is therefore possible by this configuration to accurately sense, in non-contact manner, the physical quantity for assessing the quantity of articles loaded on the troughs 31 without the sensing being affected by the side walls 31a.

The particular merit obtained by capturing an image of the articles on the troughs 31 of the radial feeders 30 by the cameras 60 in the direction from the upstream side to the downstream side in the article conveyance direction of the radial feeders 30 (sense the physical quantity in the direction from the upstream side to the downstream side in the conveyance direction) will be described using FIG. 5.

FIG. 5(a) is a view from above illustrating a state in which a single camera 60 captures an image of the articles on the troughs 31 of a plurality of (four in this case) radial feeders 30 in the direction from the upstream side to the downstream side in the article conveyance direction of the radial feeders 30. Here, in plan view, the camera 60 captures an image of the articles on a plurality of troughs 31 from a vicinity of a center O of the dispersing table 20, and from an inside of the radial feeders 30 (dispersing table 20 side) to an outside (pool hopper 40 side) thereof. In this case, the conveyance direction of the articles of the radial feeders 30, for which an image of the articles on the troughs 31 is captured by the camera 60, and an imaging direction (sight-line direction of the camera 60) of the camera 60 are parallel in plan view (see FIG. 5(a)). Parallelism herein includes not only perfect parallelism but also rough parallelism of the conveyance direction of the articles of the radial feeders 30 with the imaging direction of the camera 60. Because the side walls 31a of the troughs 31 extend radially with respect to the center O of the dispersing table 20 in plan view, straight lines extending in the imaging direction of the camera 60 from the lens position of the camera 60 in the vicinity of the center O of the dispersing table 20 do not intersect with the side walls 31a (FIG. 5(a)).

Therefore, when an image of the articles on the troughs 31 is captured in the direction from the upstream side to the downstream side in the conveyance direction of the articles of the radial feeders 30, as in FIG. 5(a), an image of the articles on a plurality of troughs 31 can be efficiently captured by a single camera 60 for the entire plurality of troughs 31. Specifically, when an image of the articles on the troughs 31 is captured in the direction from the upstream side to the downstream side in the conveyance direction of the articles of the radial feeders 30, the physical quantity can be efficiently and accurately sensed for the articles on a plurality of troughs 31 by a single camera 60.

FIG. 5(b) is a view from above illustrating a state in which a single camera 60' is installed outside of the radial feeders 30, and an image of the articles on a plurality of (four in this case) troughs 31 is captured by the camera 60' in the direction from the downstream side to the upstream side in the conveyance direction of the articles of the radial feeders 30. In plan view, the camera 60' captures an image of the articles on a plurality of troughs 31 from the outside of the radial feeders 30 (pool hopper 40 side) to the inside (dispersing table 20 side) thereof. Here, for one of the radial feeders 30 for which an image of the articles on the trough 31 thereof is captured by the camera 60', the conveyance direction of the articles of the radial feeders 30 and the imaging direction (sight-line direction of the camera 60') of the camera 60' are parallel in plan view (see FIG. 5(b)). However, for the other radial feeders 30 for which an image of the articles on the troughs 31 thereof is captured by the camera 60', the conveyance direction of the articles of the radial feeders 30 and the imaging direction of the camera 60' are not parallel in plan view (see FIG. 5(b)). For the radial feeder 30 in which the conveyance direction of the articles and the imaging direction of the camera 60' are parallel, the side walls 31a of the trough 31 and a straight line extending in the imaging direction of the camera 60' from the lens position of the camera 60' do not intersect with each other in plan view. However, for the other radial feeders 30, in which the conveyance direction of the articles and the imaging direction of the camera 60' are not parallel, the side walls 31a of the troughs 31 and straight lines extending in the imaging direction of the camera 60' from the lens position of the camera 60' intersect with each other in plan view, and the side walls 31a block the capturing of an image of the articles by the camera 60'.

Therefore, when an image of the articles on the troughs 31 is captured in the direction from the downstream side to the upstream side in the conveyance direction of the articles of the radial feeders 30, as in FIG. 5(b), it is difficult for an image of the articles on a plurality of troughs 31 to be captured by a single camera 60' for the entire plurality of troughs 31. Specifically, when an image of the articles on the troughs 31 is captured in the direction from the downstream side to the upstream side in the conveyance direction of the articles of the radial feeders 30, it is difficult for the physical quantity to be accurately sensed for the articles on a plurality of troughs 31 by a single camera 60'.

(3-2)

The combination weighing device 10 according to the present embodiment is provided with the plurality of radial feeders 30, the dispersing table 20, the charge chute 91, and the cameras 60. The radial feeders 30 are examples of the conveyance means, the dispersing table 20 is an example of the dispersing means, and the cameras 60 are examples of the sensing means. The radial feeders 30 convey articles to the weighing hoppers 50. The weighing hoppers 50 are examples of the weighing parts. The dispersing table 20 disperses and supplies articles to the radial feeders 30. The charge chute 91 is arranged above the dispersing table 20. The articles to be supplied to the dispersing table 20 are charged into the charge chute 91. The cameras 60 capture an image of the articles on the troughs 31 of the radial feeders 30, and thereby sense, in non-contact manner, the physical quantity for assessing the quantity of articles loaded on the troughs 31. The cameras 60 capture an image of the articles from a location which is above the radial feeders 30 and other than directly above the charge chute 91, in an obliquely downward direction from the upstream side to the downstream side in the conveyance direction. Specifically, the cameras 60 sense the physical quantity for assessing the quantity of articles loaded on the troughs 31, from a location which is above the radial feeders 30 and other than directly above the charge chute 91, in an obliquely downward direction from the upstream side to the downstream side in the conveyance direction.

Here, the cameras 60 capture an image of the articles in a direction along the conveyance direction of the radial feeders 30, from a location which is above the radial feeders 30 and other than directly above the charge chute 91, and it is therefore possible to obtain an overall assessment of the conveyance state of articles in the radial feeders 30 without the assessment being affected by the presence of the charge chute 91, in contrast with a case in which an image of the radial feeders 30 is captured from directly above the charge chute 91. In other words, the cameras 60 sense the physical quantity for assessing the quantity of articles loaded on the troughs 31 of the radial feeders 30, in a direction along the conveyance direction of the radial feeders 30, from a location which is above the radial feeders 30 and other than directly above the charge chute 91, and it is therefore possible to obtain an overall assessment of the conveyance state of articles in the radial feeders 30 without the assessment being affected by the presence of the charge chute 91, in contrast with a case in which the physical quantity is sensed from directly above the charge chute 91. It is therefore possible by this configuration to accurately sense, in non-contact manner, the physical quantity for assessing the quantity of articles loaded on the troughs 31 without the sensing being affected by the presence of the charge chute 91.

(3-3)

In the combination weighing device 10 according to the present embodiment, the side walls 31a of the troughs 31 of the radial feeders 30 have the highest portion thereof on the downstream side relative to the center part M of the radial feeders 30 in the conveyance direction.

Because the side walls 31a on the upstream sides of the troughs 31 of the radial feeders 30 are formed so as to be relatively low, the upstream sides of the radial feeders 30 can function as article stock parts for supplying articles equally to each radial feeder 30, as described above. Meanwhile, on the downstream sides of the radial feeders 30, in order to appropriately control the quantity of articles conveyed to the weighing hoppers 50, the side walls 31a of the troughs 31 of the radial feeders 30 are formed so that the height is greatest on the downstream side, and articles are prevented from moving between radial feeders 30.

When the side walls 31a have the highest portions thereof on the downstream side, effects such as those described below are obtained by a configuration in which the cameras 60 capture an image (obtain an image and sense the physical quantity for assessing the quantity of articles loaded on the radial feeders 30) of the articles from the upstream side to the downstream side in the conveyance direction.

When an image of the troughs 31 of a plurality of radial feeders 30 is captured by a single camera 60 and the side walls 31a of the troughs 31 are formed so that the height is greatest on the downstream side in the conveyance direction, some portions are prone to be obscured by the side walls 31a when an image of the articles is captured by the camera 60 from the downstream side. In contrast, because an image of the articles is captured from the upstream side to the downstream side in the conveyance direction in this configuration, and an image of a plurality of troughs 31 can be readily captured by a single camera 60, or, in other words, the physical quantity of the articles on a plurality of troughs 31 can readily be sensed by a single camera 60.

In this configuration, because the height of the side walls 31a of the troughs 31 of the radial feeders 30 is greatest on the downstream side of the radial feeders 30, and articles do not readily move between troughs 31 on the downstream side of radial feeders 30, the conveyance state on the downstream side of the radial feeders 30 is relatively easy to estimate when the conveyance state on the upstream side of the radial feeders 30 can be assessed. Also, because the cameras 60 capture an image of the articles on the troughs 31 of the radial feeders 30 from the upstream side to the downstream side in this configuration, an overall assessment of the conveyance state of the radial feeders 30 is easily obtained even in cases where a clear image of the more distant downstream side cannot be obtained. In other words, even in cases where the cameras 60 cannot sense the physical quantity on the more distance downstream side, an overall assessment of the conveyance state of the radial feeders 30 is easily obtained, and the physical quantity for assessing the quantity of articles loaded on the troughs 31 can easily be sensed accurately and in non-contact manner.

(3-4)

In the combination weighing device 10 according to the present embodiment includes a plurality of cameras 60, and each of the cameras 60 senses the physical quantity of the articles on the troughs 31 of two or more radial feeders 30.

Here, because an image of a plurality of troughs 31 is captured by a single camera 60, it is possible to reduce the number of cameras 60 and reduce the cost of the combination weighing device 10 relative to a case in which an image of the trough 31 of a single radial feeder 30 is captured by a single camera 60, and the physical quantity is sensed for the articles on a single trough 31.

(3-5)

In the combination weighing device 10 according to the present embodiment, the cameras 60 are installed in portions further upstream in the conveyance direction than the center parts M of the radial feeders 30 in the conveyance direction.

Here, because the cameras 60 are installed in portions further upstream than the center parts M of the radial feeders 30 in the conveyance direction, an image of the entire conveyance path is readily captured, the physical quantity for assessing the loaded quantity of articles is easily sensed for the entire conveyance path, an overall assessment of the state of articles in the conveyance path is easily obtained, and the physical quantity for assessing the quantity of articles loaded on the troughs 31 can be accurately sensed in non-contact manner.

Second Embodiment

A combination weighing device 110 according to a second embodiment of the present invention will be described.

Figure 6:
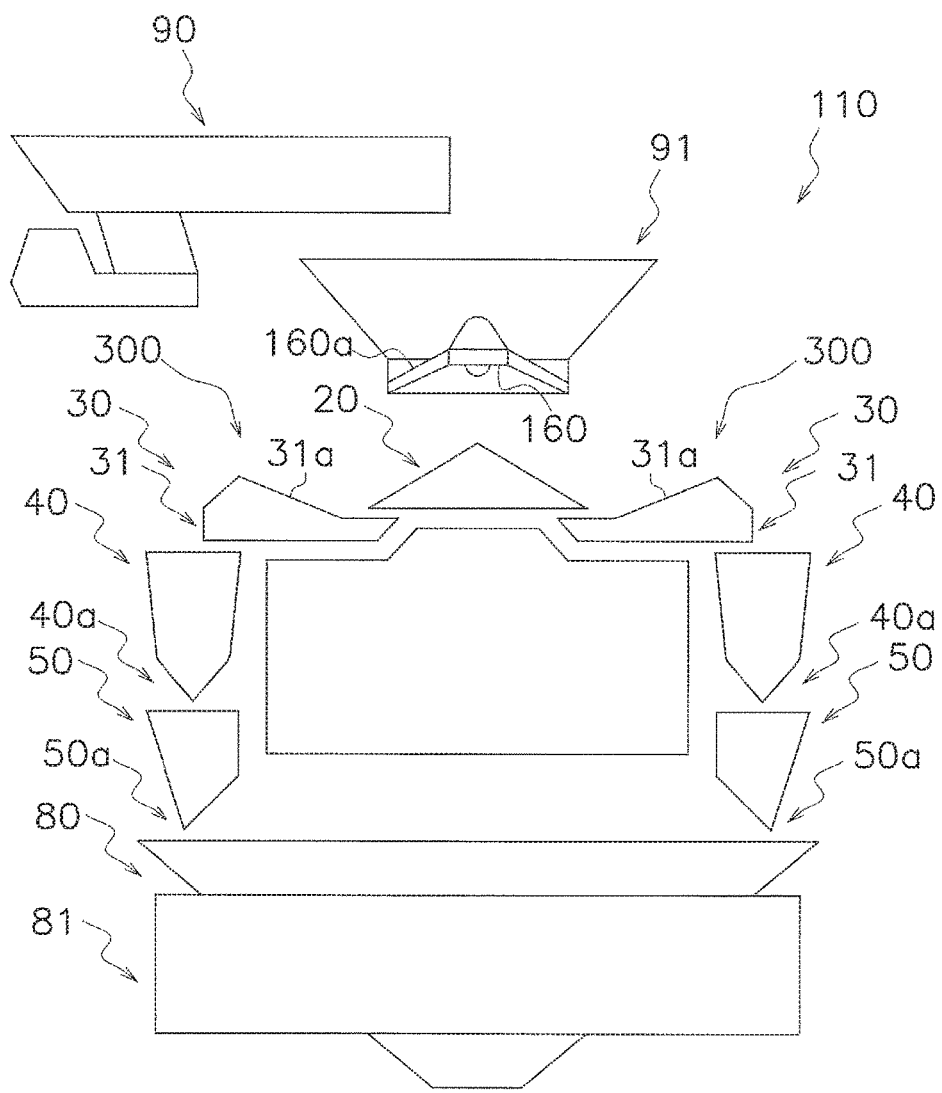
FIG. 6 is a schematic side elevational view of the combination weighing device according to a second embodiment of the present invention.

A schematic side elevational view of the combination weighing device 110 according to the second embodiment of the present invention is shown in FIG. 6. Because the combination weighing device 110 is the same as the combination weighing device 10 according to the first embodiment, except for a camera 160, only the camera 160 of the combination weighing device 110 will be described.

In the combination weighing device 110, rather than being arranged on the external peripheral surface of the charge chute 91 into which articles to be supplied to the dispersing table 20 are charged, the camera 160 is arranged inside the charge chute 91. Specifically, in the combination weighing device 110, a plurality of (four, for example) support brackets 160a are attached to an internal peripheral surface of the charge chute 91 so as to extend toward a center of the charge chute, and the camera 160 is supported by the support brackets 160a. Articles charged into the charge chute 91 from the cross feeder 90 pass between the support brackets 160a, and are supplied to the dispersing table 20.

The camera 160 is installed in a location other than directly above the charge chute 91. The camera 160 is installed above the radial feeders 30. The camera 160 is installed in a portion further upstream in the conveyance direction of the radial feeders 30 than the center parts M (see FIG. 4) of the troughs 31 of the radial feeders 30 in the conveyance direction.

In the combination weighing device 110, the camera 160 is an omnidirectional camera capable of capturing a 360° image. The camera 160 as a single camera captures an image of the articles on all of the troughs 31. The camera 160 captures an image of the articles on the troughs 31 of the radial feeders 30, from above the radial feeders 30 and in an obliquely downward direction from the upstream side (dispersing table 20 side) to the downstream side (pool hopper 40 side) in the conveyance direction of the articles of the radial feeders 30. In other words, the camera 160 senses the physical quantity for assessing the quantity of articles loaded on the troughs 31, from above the radial feeders 30 and in an obliquely downward direction from the upstream side to the downstream side in the conveyance direction of the articles of the radial feeders 30. The camera 160 also captures an image of the articles on the trough 31 of each of the radial feeders 30 from a location which is above the radial feeders 30 and other than directly above the charge chute 91, in an obliquely downward direction from the upstream side to the downstream side in the conveyance direction of the articles of the radial feeders 30. Specifically, the camera 160 senses the physical quantity for assessing the quantity of articles loaded on each of the troughs 31, from a location which is above the radial feeders 30 and other than directly above the charge chute 91, in an obliquely downward direction from the upstream side to the downstream side in the conveyance direction of the articles of the radial feeders 30. The camera 160 captures an image of the respective troughs 31 as a whole. In other words, the camera 160 is installed in a position from which an image of the articles on each of the troughs 31 can be captured over an entire range from a boundary portion between the dispersing table 20 and that trough 31 to external peripheral end part of that trough 31.

The combination weighing device 110 according to the second embodiment has the same features as described above in sections (3-1) through (3-3) and section (3-5) of the first embodiment. Except for having a single camera 160, the combination weighing device 110 also has the same features as described above in section (3-4) of the first embodiment.

Third Embodiment

A combination weighing device 210 according to a third embodiment of the present invention will be described.

Figure 7:
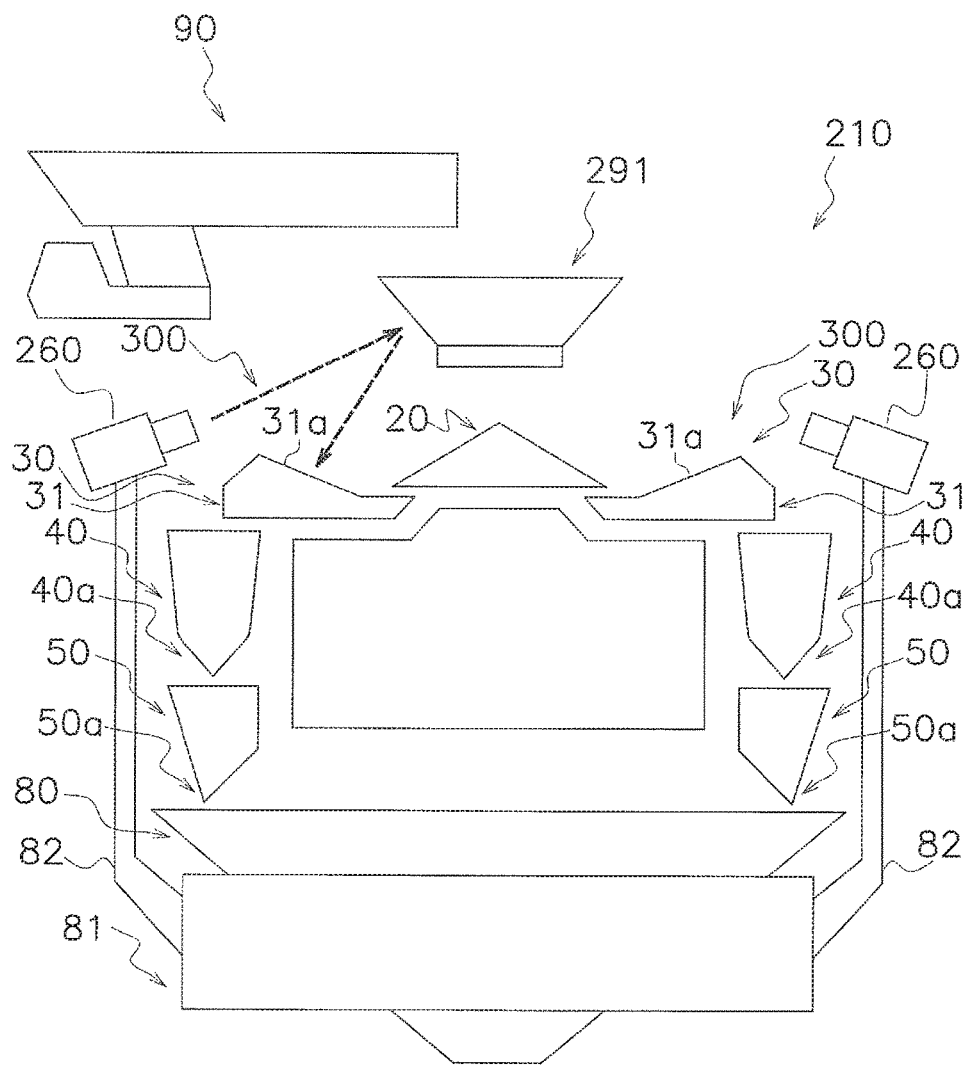
FIG. 7 is a schematic side elevational view of the combination weighing device according to a third embodiment of the present invention.

The combination weighing device 210 according to the third embodiment of the present invention is illustrated in FIG. 7. Because the combination weighing device 210 is the same as the combination weighing device 10 according to the first embodiment, except for a charge chute 291 and cameras 260, only the charge chute 291 and the cameras 260 of the combination weighing device 210 will be described.

In the combination weighing device 210, the cameras 260 are not attached to the charge chute 291. The charge chute 291 is made of stainless steel and is mirror-finished so that the troughs 31 of the radial feeder 30 are reflected in an external peripheral surface thereof. The other aspects of the charge chute 291 are the same as in the charge chute 91 of the combination weighing device 10 according to the first embodiment, and therefore will not be described here.

In the combination weighing device 210, the cameras 260 are supported by support brackets 82 extending upward from the main body frame 81 of the combination weighing device 210. The number of cameras 260 in the combination weighing device 210 is four.

The cameras 260 are installed further to the outside from the dispersing table 20 as a reference point than the external peripheral end parts of the troughs 31 of the radial feeders 30. Specifically, the cameras 260 are installed in locations other than directly above the charge chute 91. The four cameras 260 are installed at intervals of 90° about the center of the dispersing table 20 in plan view, so as to be arranged at equal intervals around the radial feeders 30.

The cameras 260 capture a mirror image, reflected in the external peripheral surface of the charge chute 291, of the articles on the troughs 31, i.e., on the radial feeders 30, as indicted by dotted lines in FIG. 7. The cameras 260 are installed further to the outside from the dispersing table 20 as a reference point than the external peripheral end parts of the troughs 31 of the radial feeders 30, but capture a mirror image reflected in the external peripheral surface of the charge chute 291, and thereby capture an image of the articles from above the radial feeders 30, in an obliquely downward direction from the upstream side to the downstream side in the conveyance direction of the articles of the radial feeders 30, as described above. In other words, the cameras 260 sense the physical quantity for assessing the quantity of articles loaded on the troughs 31, from above the radial feeders 30 and in an obliquely downward direction from the upstream side to the downstream side in the conveyance direction of the articles of the radial feeders 30. By capturing a mirror image reflected in the external peripheral surface of the charge chute 291, the cameras 260 capture an image of the articles from a location which is above the radial feeders 30 and other than directly above the charge chute 291 (from the external peripheral surface of the charge chute 291), in an obliquely downward direction from the upstream side to the downstream side in the conveyance direction of the articles of the radial feeders 30. Specifically, the cameras 260 sense the physical quantity for assessing the quantity of articles loaded on the troughs 31, from a location which is above the radial feeders 30 and other than directly above the charge chute 291, in an obliquely downward direction from the upstream side to the downstream side in the conveyance direction of the articles of the radial feeders 30. The cameras 260 capture an image of the respective troughs 31 as a whole. In other words, the cameras 60 are attached to the support brackets 82 in a position and orientation whereby an image of the articles on each of the troughs 31 can be captured over an entire range from a boundary portion between the dispersing table 20 and that trough 31 to external peripheral end part of that trough 31.

Each of the cameras 260 captures an image of articles on a plurality of troughs 31. An image of the articles on any of the troughs 31 is captured by at least one camera 260 from a location which is above the troughs 31 and other than directly above the charge chute 291, in an obliquely downward direction from the upstream side to the downstream side in the conveyance direction of the troughs 31. The articles on a trough 31 may include articles for which images are captured redundantly by two cameras 260.

The combination weighing device 210 according to the third embodiment has the same features as described above in sections (3-1) through (3-4) of the first embodiment.

<Modifications>

Modifications of the above embodiments are described below. The modifications described below may be combined with other modifications insofar as the modifications are not inconsistent with each other.

(1) Modification A

In the combination weighing devices 10, 110, 210 according to the first through third embodiments, radial feeders 30 are arranged so that a plurality of troughs 31 extend radially from the dispersing table 20, but the combination weighing device according to the present invention is not limited to this type of combination weighing device.

Figure 8:
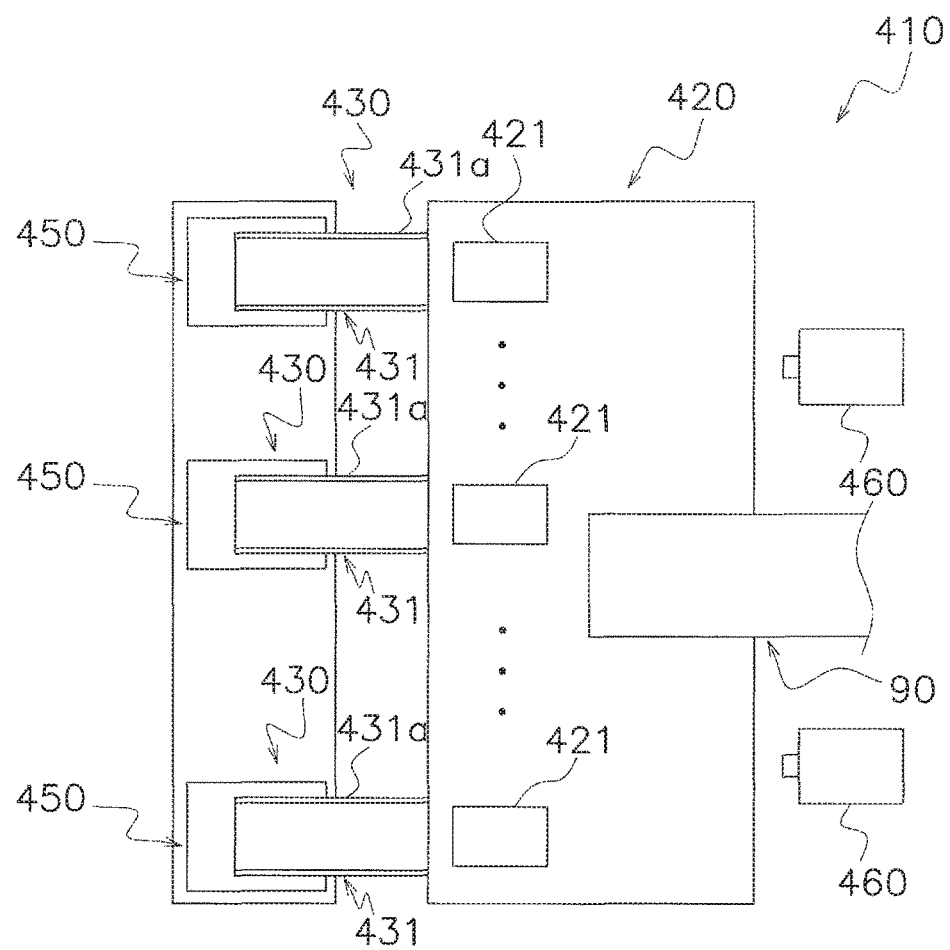
FIG. 8 is a schematic plan view of the combination weighing device according to Modification A.

For example, the combination weighing device according to the present invention may be configured as a combination weighing device 410 in which a plurality of conveyance feeders 430 extend parallel to each other from a supply hopper 420, such as illustrated in FIG. 8.

The combination weighing device 410 will next be described.

In the combination weighing device 410, a cross feeder 90 supplies articles to a supply hopper 420, on a bottom surface of which a plurality of (fourteen, for example) supply holes 421 are formed. The supply hopper 420 is an example of the dispersing means, and disperses and supplies articles supplied thereto to a plurality of conveyance feeders 430 extending in the same direction from below the respective supply holes 421. The articles supplied from the supply hopper 420 to the conveyance feeders 430 are conveyed on troughs 431 provided to the conveyance feeders 430 to weighing hoppers 450 which respectively correspond to the troughs 431. Each of the troughs 431 is formed so as to be concave and opens at a top thereof, and has side walls 431a for surrounding sides of an article conveyance path same as the troughs 31 of the combination weighing device 10 according to the first embodiment. The side walls 431a extends upward and along a conveyance direction of the radial feeders 430 (see FIG. 8). The shape of the side walls 431a is the same as that of the side walls 31a of the combination weighing device 10 according to the first embodiment, and the shape of the side walls 431a has the highest portion thereof on the downstream side relative to a center part of the troughs 431 in the conveyance direction of the articles of the conveyance feeders 430.

Cameras 460 are arranged on an opposite side of the supply hopper 420 with respect to the conveyance feeders 430 (see FIG. 8). The cameras 460 are installed in portions further upstream in the conveyance direction of the articles than the center parts of the troughs 431 in the article conveyance direction of the conveyance feeders 430. Each of the cameras 460 captures an image of articles on a plurality of troughs 431. An image of the articles on any of the troughs 431 is captured by at least one camera 460. The cameras 460 capture an image of the articles from above the conveyance feeders 430, in an obliquely downward direction from the upstream side to the downstream side in the conveyance direction of the conveyance feeders 430. In other words, the cameras 460 sense the physical quantity for assessing the quantity of articles loaded on the troughs 431 of the conveyance feeders 430, from above the conveyance feeders 430 and in an obliquely downward direction from the upstream side to the downstream side in the conveyance direction of the articles of the conveyance feeders 430. The cameras 460 capture an image of the respective troughs 431 as a whole. In other words, the cameras 460 are installed in a position and orientation whereby an image of the articles on each of the troughs 431 can be captured over an entire range from a boundary portion between the supply hopper 420 and that trough 431 to end part on the weighing hopper 450 side of that trough 431.

The combination weighing device 410 configured such as described above also has the same features as described above in sections (3-1) and sections (3-3) through (3-5) of the first embodiment.

(2) Modification B

In the combination weighing devices 10, 110, 210 according to the first through third embodiments, the control device 70 changes an operating parameter such as the oscillation intensity and/or oscillation time of the radial feeders 30 based on the physical quantity for assessing the quantity of articles loaded on the troughs 31, obtained from images captured by the cameras 60, 160, 260. However, the present invention is not limited to this configuration.

For example, a configuration may be adopted whereby, instead of the control device 70 of the combination weighing device 10, 110, 210 changing operating parameters, a worker changes operating parameters such as the oscillation intensity or oscillation time of the radial feeders 30 through use of the touch panel 75, based on the physical quantity for assessing the quantity of articles loaded on the troughs 31, obtained from images captured by cameras 60. The worker may also sense an abnormality in the radial feeders 30 based on the images captured by the camera 60 and perform necessary maintenance work.

(3) Modification C

In the combination weighing devices 10, 110, 210 according to the first through third embodiments, the image captured by the cameras 60, 160, 260 is displayed without modification thereof on the touch panel 75. However, the present invention is not limited to this configuration. For example, in such cases as when the image captured by the cameras 60, 160, 260 is distorted, image processing may be performed for correcting the distortion, and the processed image may be displayed on the touch panel 75.

When images of the articles on the troughs 31 are captured by a plurality of cameras 60, 260, as in the combination weighing devices 10, 210 according to the first and third embodiments, an image obtained by synthesizing a plurality of captured images into a single image may be displayed on the touch panel 75.

(4) Modification D

In the combination weighing devices 10, 110, 210 according to the first through third embodiments, the cameras 60, 160, 260 capture an image of the articles on each of the troughs 31 over the entire range from a boundary portion between the dispersing table 20 and that trough 31 to external peripheral end parts of that trough 31. However, the present invention is not limited to this configuration. On the downstream sides of the radial feeders 30, articles are prevented from moving between troughs 31 by the side walls 31a, and the conveyance state of articles on the troughs 31 is readily estimated, as described above, and it is therefore sufficient insofar as the cameras 60, 160, 260 capture an image of at least the upstream sides of the troughs 31 (sense the physical quantity for assessing the quantity of articles loaded on the upstream sides of the troughs 31). An image of the boundary portion between the dispersing table 20 and the troughs 31 is preferably captured.

However, in order to more accurately assess the conveyance state of articles on the troughs 31 and accurately assess the physical quantity relating to the articles on the troughs 31, the cameras 60, 160, 260 preferably capture an image of the conveyance state of the articles which spans the troughs 31 as a whole.

(5) Modification E

There are three cameras 60 in the combination weighing device 10 according to the first embodiment, but this number of cameras 60 is given by way of example, and the present invention is not limited to this configuration. For example, the number of cameras 60 may be two, or four or more.

It is sufficient insofar as the horizontal view angle of the lenses of the cameras 60 is determined according to the number of cameras 60 and the desired image to be captured. The larger the horizontal view angle of the lens of each camera 60 is, the more possible it is to capture an image of the state of article conveyance on all of the troughs 31 using less number of cameras 60. However, the larger the horizontal view angle of the cameras 60 is, the more that distortion occurs at peripheral edges of the captured image. A smaller horizontal view angle of the lenses of the cameras 60 is preferred in order to obtain a distortion-free image.

For example, a camera 60 may be provided to each of the radial feeders 30 in order to capture a detailed image of the conveyance state of articles on each of the troughs 31 in the combination weighing device 10. However, the number of cameras 60 is preferably kept as small as possible in a range allowing the necessary image to be obtained, in order to minimize the manufacturing cost of the combination weighing device 10.

(6) Modification F

The camera 160 is an omnidirectional camera in the combination weighing device 110 according to the second embodiment, but the present invention is not limited to this configuration. For example, the combination weighing device 110 may be configured so that a plurality of cameras the same as the cameras 60 of the combination weighing device 10 according to the first embodiment are attached as cameras 160 to the support brackets 160a, and an image of the state of article conveyance on the troughs 31 is captured by the plurality of cameras 160.

However, the use of an omnidirectional camera makes it possible to minimize the number of cameras and to minimize the manufacturing cost of the combination weighing device 110. The use of an omnidirectional camera as the camera 160 also makes it possible to assess the state of article conveyance on all of the troughs 31 by a single captured image. The camera 160 is therefore preferably an omnidirectional camera.

(7) Modification G

There are four cameras 260 in the combination weighing device 210 according to the third embodiment, but this number of cameras 260 is given by way of example, and the present invention is not limited to this configuration. It is sufficient insofar as the number of cameras 260 is appropriately determined so that an image of the conveyance state of articles on all of the troughs 31 can be captured with the necessary image quality.

(8) Modification H

In the combination weighing device 210 according to the third embodiment, the external peripheral surface of the charge chute 291 is mirror finished, and a mirror image reflected by the charge chute 291 is captured by the cameras 260. However, the present invention is not limited to this configuration. For example, instead of mirror-finishing the charge chute 291, a mirror for producing a mirror image may be installed on the external peripheral surface of the charge chute 291. However, providing a separate mirror increases the number of components of the combination weighing device 210, and mirror-finishing the external peripheral surface of the charge chute 291 is therefore preferred in order to minimize the number of components.

(9) Modification I

The cameras 60, 160 are attached to the charge chute 91 in the combination weighing devices 10, 110 according to the first and second embodiments, but the present invention is not limited to this configuration. For example, support brackets 82 extending from the main body frame 81 may be provided in the combination weighing devices 10, 110 in the same manner as in the combination weighing device 210 according to the third embodiment, and cameras 60, 160 may be supported by the support brackets 82 in the same positions as the installation positions for the cameras 60, 160 of the combination weighing devices 10, 110. However, when a charge chute 91 is present, the cameras 60, 160 are preferably attached to the charge chute 91 in order to minimize the manufacturing cost of the combination weighing devices 10, 110.

(10) Modification J

The combination weighing devices 10, 110, 120 according to the first through third embodiments have the charge chute 91, but this configuration is not limiting, and the charge chute 91 may also be omitted. However, the charge chute 91 is preferably provided in order to prevent articles supplied from the cross feeder 90 from scattering out of the dispersing table 20.

(11) Modification K

The radial feeders 30 have side walls 31a in the combination weighing devices 10, 110, 120 according to the first through third embodiments, but this configuration is not limiting, and the radial feeders 30 may not have side walls 31a. However, the side walls 31a are preferably provided to the radial feeders 30 in order to prevent articles from moving between radial feeders 30.

(12) Modification L

The number of conveyance/weighing mechanisms 300 is fourteen in the combination weighing devices 10, 110, 210 according to the first through third embodiments, but this number of conveyance/weighing mechanisms 300 is given by way of example, and the present invention is not limited to this configuration.

(13) Modification M

The cameras 60, 160, 260 as sensing means in the combination weighing devices 10, 110, 210 according to the first through third embodiments may be time-of-flight (TOF)-type cameras. A TOF-type camera has an LED or other light source and an imaging part, and can measure a distance to articles by measuring a delay time taken for light radiated from the light source to reflect on the article and return to the imaging part. When a distance acquired in this manner is used, the stacking height of articles on the troughs 31 is easily sensed as a physical quantity for assessing the quantity of articles loaded on the troughs 31, for example.

(14) Modification N

Sensing means other than cameras may be used in the combination weighing devices 10, 110, 210 according to the first through third embodiments.

The sensing means may be an optical displacement sensor, for example. An optical displacement sensor has a light source and a light-receiving element (position-sensitive device (PSD) and/or a charge-coupled device (CCD) or the like), and can measure the distance to articles by perceiving a change in the position at which light radiated from the light source and reflected by the articles forms an image on the light-receiving element. When the optical displacement sensor is configured so as to radiate light from the light source from a location which is above the radial feeders 30 and other than directly above the charge chute 91, in an obliquely downward direction from the upstream side to the downstream side in the conveyance direction of the radial feeders 30, and receive reflected light through use of the light-receiving element, for example, the optical displacement sensor can accurately sense the stacking height or another characteristic of the articles on the troughs 31 as a physical quantity for assessing the quantity of articles loaded on the troughs 31.

The sensing means may also be an ultrasonic displacement sensor, for example. The ultrasonic displacement sensor has a sensor head for emitting ultrasonic waves and receiving ultrasonic waves reflected from articles, and can measure the distance to the articles by measuring a time difference between emission and reception of the ultrasonic waves. When the ultrasonic displacement sensor is configured so as to emit ultrasonic waves from the sensor head from a location which is above the radial feeders 30 and other than directly above the charge chute 91, in an obliquely downward direction from the upstream side to the downstream side in the conveyance direction of the radial feeders 30, and receive reflected ultrasonic waves through use of the sensor head, for example, the ultrasonic displacement sensor can accurately sense the stacking height or another characteristic of the articles on the troughs 31 as a physical quantity for assessing the quantity of articles loaded on the troughs 31.

The sensing means may also be configured so as to measure a loading state of articles on the troughs 31 from a location which is above the radial feeders 30 and other than directly above the charge chute 91, in an obliquely downward direction from the upstream side to the downstream side in the conveyance direction of the radial feeders 30, and sense the stacking height and/or the sparseness or density of the articles on the troughs 31 as a physical quantity for assessing the quantity of articles loaded on the troughs 31 using a light-section method and/or a pattern irradiation method or the like.

INDUSTRIAL APPLICABILITY

The combination weighing device according to the present invention is useful as a combination weighing device whereby a physical quantity for assessing the quantity of articles loaded on a conveyance path for conveying articles to a weighing part can be accurately sensed in non-contact manner in order to appropriately control the supplying of articles to the weighing part, without the sensing being affected by a structure above the combination weighing device and/or side walls provided to sides of the conveyance path.

REFERENCE SIGNS LIST

10, 110, 210, 410 combination weighing device
20 dispersing table (dispersing means)
30 radial feeder (conveyance means)
31*a*, 431*a* side wall
50, 450 weighing hopper (weighing part)
60, 160, 260, 460 camera (imaging means)
91, 291 charge chute
430 radial feeder (conveyance means)

CITATION LIST

Patent Literature

[Patent Literature 1] International Publication WO 95/31702
[Patent Literature 2] Japanese Laid-open Patent Publication No. 2010-151787

The invention claimed is:

1. A combination weighing device comprising:
a plurality of conveyors each configured to convey articles to a weighing part, each of the conveyors having side walls for surrounding a side of an article conveyance path, the side walls extending upward and along a conveyance direction of the articles; and
a one or a plurality of cameras configured to sense, in non-contact manner, a physical quantity for assessing a quantity of articles loaded on the conveyors,
the camera or cameras configured to sense the physical quantity from above the conveyors, and in an obliquely downward direction from an upstream side to a downstream side in the conveyance direction,
the camera or cameras configured to capture an image of the articles on the conveyors over an entire range of each of the conveyors from an upstream end to a downstream end in the conveyance direction for all of the conveyors, and
each of the cameras configured to sense the physical quantity of the articles on two or more of the conveyors.

2. The combination weighing device according to claim 1, wherein the combination weighing device further comprises:
a disperser configured to disperse and supply articles to the conveyors; and
a charge chute into which articles to be supplied to the disperser are configured to be charged, the charge chute being arranged above the disperser,
the camera or cameras configured to sense the physical quantity from a location which is above the conveyors and other than directly above the charge chute.

3. The combination weighing device according to claim 1, wherein
the side walls have a highest portion thereof on a downstream side relative to a center part of the conveyors in the conveyance direction.

4. The combination weighing device according to claim 1, wherein
the camera is or the cameras are installed in a portion further upstream in the conveyance direction than a center part of the conveyors in the conveyance direction.

\* \* \* \* \*